3,171,747
BAKER'S DUSTING COMPOSITION AND METHOD UTILIZING SAID COMPOSITION
Gene L. Kessinger, Decatur, Ill., assignor to A. E. Staley Manufacturing Company, Decatur, Ill., a corporation of Delaware
No Drawing. Filed Dec. 20, 1962, Ser. No. 245,965
14 Claims. (Cl. 99—93)

My invention relates to bakers' dusting compositions. More particularly, it relates to a dry, powdered starch composition suitable for use in the dusting of bakery goods such as bread and buns and a process for its application.

Bakers have long desired to use starch as a replacement for flour in the dusting of bakery products such as bread and buns. Flour, the presently accepted dusting agent, is utilized to minimize the sticking of unbaked bread doughs, one to another, and to bakery equipment. Because of a great number of factors, it has long been believed that powdered starch would be preferable to flour as a dusting agent. Potentially, the use of starch is more economical than the use of flour, primarily because of the superior drying properties of starch. This superior feature of starch indicates that a smaller amount of starch than flour could be used to obtain comparable dough drying effects. Another important advantage to the baking industry which would arise from the use of starch instead of flour stems from the fact that starch does not support weevil growth whereas weevils thrive on flour. Thus, the ability to more effectively control the weevil problem by the substitution of starch for flour, as a baker's dusting agent, would result in additional savings. Further advantages resulting from the use of starch will become apparent from the remaining portion of this disclosure.

Because of the many advantages offered by the use of starch as a dusting composition, the baking industry has previously attempted to utilize dry, powdered starches in the dusting of bread. However, the use of conventional powdered starch as a baker's dusting composition has not been successful due mainly to its highly mobile character. When starch is utilized with conventional bread dusting equipment, it flows uncontrollably and thereby creates a great amount of dust in the atmosphere, thus not only posing a general health problem for operators of the baking equipment but increasing the already high cost of maintaining cleanliness in the bakery. Also, because of the mobile character of starch, the baking industry has not found it possible to consistently be able to uniformly apply conventional powdered starch in proper amounts on bakery products. The main problem arises from the application of excess starch which has an adverse effect on the texture and make-up of bread doughs.

I have now discovered a new starch composition which is highly advantageous for the dusting of bakery products. My new composition possesses none of the drawbacks possessed by previous starch compositions used as bakers' dusting agents, especially since the use of my new composition reduces the level of dust released to the atmosphere to the level of dust released by flour. In addition, the use of my composition permits a reduction in the amount of baker's dusting agent used in a given operation as compared to the amount used when flour is the dusting agent. This reduction is due chiefly to the superior dough drying properties of my new composition. Furthermore, my new composition flows at an easily controllable rate, thereby permitting uniform dough coverage and avoiding excess application of starch. Thus, my new composition is economical for it not only possesses all of the natural advantages of starch over flour but it can be safely and easily utilized in conventional bakery dusting equipment.

Generally, my new baker's dusting composition comprises a dry intimate mixture, in powdered form, of a gelatinized starch and a granular starch containing an edible oil, of which mixture upwards of 99% can be passed through a #40 mesh screen and upwards of 50% can not be passed through a #270 mesh screen, the mixture having a bulk density ranging from about 25 lbs./cubic foot to about 38 lbs./cubic foot.

Although the proportions of dry, powdered gelatinized starch to granular starch can vary widely in my new composition, depending upon various conditions and factors such as humidity, type of bakery product to be dusted, particular dusting equipment to be utilized, etc., I generally prefer to utilize from about 70 to about 50% by weight of granular starch and correspondingly from about 30 to about 50% by weight of dry, powdered gelatinized starch, all weights based on the weight of the bakers' dusting composition. For optimum results, under most baking conditions, I prefer to utilize from about 60 to about 50% by weight of the granular starch and correspondingly from about 50 to about 40% by weight of the gelatinized starch.

Generally, I have found that a satisfactory baker's dusting composition is obtained when the cold water solubility of the gelatinized portion is no lower than 5% and no higher than 70%. When the cold water solubility of the gelatinized portion is too low the dusting composition becomes excessively mobile and is less controllable. However, when the cold water solubility is too high, the dough-drying efficiency of the dusting composition is reduced. For the present purpose, cold water solubility (CWS) is defined as the percent by weight of starch dry substance which dissolves in water at 25° C. according to the following procedure:

One gram of the starch product ground to pass a 40-mesh sieve is shaken 2 hours with 50 grams of distilled water at 25° C. in a 100 ml. Kohlrausch flask with a Burrell wrist-action shaker. Water is then added to the flask to the 100 ml. mark, the contents are mixed thoroughly, transferred to a 250 ml. round bottom centrifuge tube and centrifuged for 15 minutes at 2000 r.p.m. A 25 ml. aliquot of the clear centrifugate is transferred to a tared aluminum pan and evaporated to dryness on a steam bath. The dish is then dried to constant weight in an oven at 110° C. The weight of dried material in the pan multiplied by 400 and divided by the dry starch weight of the original sample is the cold water solubility of the starch product.

Generally, I prefer to utilize as the gelatinized starch portion of my composition, gelatinized starch having a cold water solubility of from about 10 to about 60%. For optimum results, I have found that, under most conditions and especially under conditions of high humidity, it is preferable to use a gelatinized starch having a cold water solubility of from about 30 to about 50%.

The dry, powdered gelatinized portion of my baker's dusting composition can be prepared by any suitable means. One such means for preparing the gelatinized portion of my new composition is by a method described in U.S. Serial No. 100,354 by John A. Wagoner and Thomas F. Protzman, filed April 3, 1961, now Patent No. 3,137,592. This method generally consists of intensely working or shearing a mixture of a major portion of starch and a minor portion of a starch-swelling agent, such as water, in a confining chamber at elevated temperatures, preferably ranging from about 125 to about 250° C., and at pressures above the autogenous vapor pressure of the starch-starch swelling agent mixture for a short period of time, usually ranging from about 0.5 to about 5 minutes and, immediately after said working, transferring the worked mixture through an extrusion orifice to a zone of substantially reduced temperature and pressure. This is referred to as the extrusion method and I generally prefer to utilize this method in preparing the gelatinized starch portion of my new composition. I have found that thereby I can most economically obtain a satisfactory product, and can readily control the bulk density of the starch. The gelatinized portion of my new composition prepared by the aforementioned suitable methods can then be ground into a dry powder.

Other methods for making the gelatinized portion of my starch composition include the well-known "hot-roll" method which consists of preparing an aqueous starch paste and drying the said paste with a drum drier on hot rolls and the well-known spray drying method in which a prepared starch paste is dried in a spray drier.

The gelatinized starch utilized in my invention is not limited to untreated native starch. For example, I can utilize modified starches, and coated starches. A modified starch is one which has been treated with a starch modifying agent. Such starch modifying agents can be hydrolytic or oxidative in their action, they can serve as cross-linking agents for starch or they can form derivatives such as ethers or esters with starch hydroxyl groups. Examples of such modifying agents are disclosed in U.S. Patent 2,853,484, issued September 23, 1958, to Jan Lolkema et al., U.S. Patent 2,989,521, issued June 20, 1961, to F. R. Senti et al., and U.S. Patent 3,033,853, issued May 8, 1962, to Eugene P. Klug. By proper selections of modified starches, I can conveniently obtain gelatinized starches with the desired cold water solubility. For example, if a gelatinized starch of low cold water solubility is desired, starches modified with agents such as epichlorohydrin, phosphorous oxychloride or acrolein are utilized. However, when a gelatinized starch having high cold water solubility is desired, starches modified with agents such as hydrochloric acid, sodium hypochlorite, ethylene oxide, propylene oxide, dimethyl sulfate, methyl chloride, sodium chloroacetate, vinyl acetate or acetic or other lower alkyl acid anhydrides can be utilized. Metal salts of long chain fatty acids, for example, magnesium stearate and calcium stearate can be used as coating agents to obtain gelatinized starch of low cold water solubility.

When a native, i.e. unmodified starch is used to prepare the gelatinized portion of my new composition, the starch should be gelatinized and dried at a neutral or slightly alkaline pH of from about 6.0 to about 9.0. Native starch is normally at a pH of approximately 5. I prefer to utilize a starch having a pH of from 6.8 to 8.0. The acidity in starch can be neutralized by the addition of a suitable neutralizing agent such as calcium hydroxide or sodium hydroxide. The neutralization is easily accomplished by the addition of the neutralizing agent to wet starch immediately prior to gelatinization.

Chiefly because of its low cost, I prefer to utilize neutralized native starch as the gelatinized portion of my new composition.

The granular starch portion of my new composition should contain from about 0.5 to about 0.05% by weight of an edible oil such as an edible glyceride oil or mineral oil; for example, coconut oil, corn oil, soybean oil, etc. I prefer, however, to utilize about 0.1 percent by weight of edible oil, the weight based on the weight of the granular starch in the composition. I also prefer, because of its stability, to utilize coconut oil.

As previously stated, the bulk density of my baker's dusting composition should not exceed 38 pounds per cubic foot and should not be less than 25 pounds per cubic foot. I prefer that my composition have a bulk density of from 28 to 32 pounds per cubic foot. For the present purpose, bulk density is determined by the following procedure:

A sample of baker's dusting composition is added to a tared 600 ml. stainless steel beaker until the beaker overflows. The beaker is then leveled and the weight in grams of the contents of the beaker is determined. The ratio of the weight in grams of the contents to the volume of the beaker is the bulk density as expressed in grams per cubic centimeter. The bulk density in pounds per cubic foot is obtained by multiplying the figure obtained by 62.43.

Also, as previously stated, upwards of 99% of the baker's dusting composition should pass through a #40 mesh screen but no more than 50% of the composition should pass through a #270 mesh screen. For optimum results, I have found that 100% of the composition should pass through a #40 mesh screen, while at least 80% of the composition should pass through a #100 mesh screen and no more than 20% of the composition should pass through a #270 mesh screen. The screens utilized for measurement are the U.S. Bureau of Standards Sieve Series screens.

The starch utilized in my dusting composition can be obtained from the root, the stem or the fruit of a starch-producing plant, including potato, cassava, sorghum, sago, corn, etc. I prefer to use starch derived from corn.

The following examples are offered to illustrate my invention.

Example I

To demonstrate the dough drying efficiency of my new composition, a dusting composition was prepared consisting of a mixture of 45% by weight of dry powdered gelatinized starch and 55% by weight of a confectioners molding starch containing 0.1% coconut oil the composition having a bulk density of 30 pounds per cubic foot. The gelatinized starch had a cold water solubility of 59% and was prepared by forming native starch into wet pellets having a water content of about 22%, adjusting the pH of the wet pelletized starch to 7.0 with calcium hydroxide and then passing the native, neutralized starch through a conventional screw type extruder of the type described in the above mentioned U.S. Serial Number 100,354. The temperature in the extruder ranged from 135 to 160° C. and the extruder orifice size was 0.025 inch. The dry powdered mixture was then passed through a #40 mesh screen. Six moist bread doughs which had been exposed to 100% humidity for 15 minutes were uniformly dusted with the mixture. On each of the dusted doughs was then placed a disc weighing 48 grams. The discs were allowed to remain on the doughs for a period of 15 minutes and were then removed, noting the force in grams required to release the discs from the dough surface. An average force of 28.7 grams was required to remove the discs from the doughs. The dough drying efficiency or ability to lessen the stickiness of the dough is measured by the force required to release the discs from the dough surface. An increase in force required shows a decrease in dough drying efficiency.

Example II

The procedure of Example I was followed with the exception that flour was utilized as the dusting agent. An average force of 43.0 grams was required to remove the discs from the flour dusted doughs. The dough drying efficiency of my new dusting composition is readily seen from a comparison of the results of Example I and Example II.

The following Examples III through X inclusive further illustrate the dough-drying efficiency of my bakers' dusting composition. The procedures utilized in Examples I and II were followed. The dusting compositions flowed in an easily controllable manner and were uniformly applied to the doughs. The results of these tests are shown in the following table and are expressed as a percent improvement over the results obtained from the use of flour as shown in Example II.

| | Extruded Gelatinized Starch | Percent by Weight Oil in Granular Starch | Percent by Weight Gelatinized Starch | Percent by Weight Granular Starch | CWS Gelatinized Portion | Bulk Density, lb./cu.ft. | Percent Reduction in Force |
|---|---|---|---|---|---|---|---|
| Example III | Unmodified Native Pearl, pH of 8.0. | 0.1 Coconut Oil | 50 | 50 | 59 | 28.2 | 12 |
| Example IV | do | do | 40 | 60 | 55 | 29.2 | 23 |
| Example V | do | do | 45 | 55 | 65 | 28.5 | 23 |
| Example VI | Acid-modified starch crosslinked with 1% epichlorohydrin. | do | 50 | 50 | 9 | 35.5 | 67 |
| Example VII | Acid-modified starch crosslinked with 1% POCl₃. | do | 50 | 50 | 7 | 36.0 | 65 |
| Example VIII | Acid-modified starch crosslinked with 0.5% acrolein. | do | 50 | 50 | 24 | 30.0 | 21 |
| Example IX | Acid-modified starch coated with 0.7% Mg sterate. | do | 50 | 50 | 15 | 30 | 41 |
| Example X | Acid-modified starch crosslinked with 0.5% epichlorohydrin. | do | 50 | 50 | 10 | 30.8 | 42 |

*Example XI*

Further illustrations of my invention are dry intimate mixtures of 45% by weight of powdered, gelatinized unmodified native pearl starch produced by the "hot-roll" method, having a pH of 8.0 and having a cold water solubility of 50%, and 55% by weight of confectioners' molding starch, containing a small amount of coconut oil, the mixtures having a bulk density of about 28–30 pounds per cubic foot.

*Example XII*

Further illustrations of my invention are dry intimate mixtures of 45% by weight powdered, gelatinized unmodified native pearl starch having a pH of 7.0 produced by the spray drying method, and having a cold water solubility of about 50%, and 55% by weight confectioners molding starch containing a small amount of coconut oil, the said mixtures having a bulk density of about 28–30 pounds per cubic foot.

Since many embodiments of this invention may be made and since many changes may be made in the embodiments described, the foregoing is to be interpreted as illustrative and my invention is defined by the claims appended hereafter.

I claim:

1. A baker's dusting composition in dry, powdered form comprising a dry intimate mixture of from about 70 to about 50 percent by weight of granular starch, and correspondingly from about 30 to about 50 percent by weight of gelatinized starch, the weights based on the weight of the mixture, the said granular starch containing from about 0.5 to about 0.05 percent by weight of an edible oil based on the weight of the granular starch, the said gelatinized starch having a cold water solubility ranging from about 5 to about 70 percent, the said mixture having a bulk density ranging from 25 pounds per cubic foot to 38 pounds per cubic foot with the proviso that no less than 99% of the mixture is capable of passing through a #40 mesh screen but no more than 50% is capable of passing through a #270 mesh screen.

2. The composition of claim 1 wherein the granular starch is present in amounts ranging from about 50 to about 60 percent and correspondingly the gelatinized starch is present in amounts ranging from about 40 to about 50 percent.

3. The composition of claim 2 wherein the gelatinized portion has a cold water solubility of from about 10 to about 60 percent.

4. The composition of claim 1 wherein the oil is coconut oil.

5. The composition of claim 1 wherein the bulk density ranges from 28 to 32 pounds per cubic foot.

6. The composition of claim 1 wherein 100% of the composition is capable of passing through a #40 mesh screen, 80% of the composition is capable of passing through a #100 mesh screen and no more than 20% of the composition is capable of passing through a #270 mesh green.

7. A process for the dusting of bakery dough to prevent sticking of the dough which comprises uniformly dusting bakery dough with a dry, powdered starch composition comprising from about 70 to about 50 percent by weight of granular starch and correspondingly from about 30 to about 50 percent by weight of gelatinized starch, the weights based on the weight of the composition, the said granular starch containing from about 0.5 to about 0.05 percent by weight of an edible oil based on the weight of the granular starch, the said gelatinized starch having a cold water solubility ranging from about 5 to about 70 percent, the said composition having a bulk density ranging from 25 pounds per cubic foot to 38 pounds per cubic foot, with the proviso that no less than 99% of the composition is capable of passing through a #40 mesh screen but no more than 50% is capable of passing through a #270 mesh screen.

8. The process of claim 7 wherein the granular starch is present in amounts ranging from about 50 to about 60 percent and correspondingly the gelatinized starch is present in amounts ranging from about 40 to about 50 percent.

9. The process of claim 8 wherein the gelatinized portion of starch has a cold water solubility of from about 10 to about 60 percent.

10. The process of claim 8 wherein the gelatinized starch is derived by gelatinizing and drying native starch having a pH of from about 6.0 to about 9.0.

11. The process of claim 7 wherein the oil is coconut oil.

12. The process of claim 7 wherein the bulk density ranges from 28 to 32 pounds per cubic foot.

13. The process of claim 7 wherein 100% of the composition is capable of passing through a #40 mesh screen, 80% of the composition is capable of passing through a #100 mesh screen and no more than 20% of the composition is capable of passing through a #270 mesh screen.

14. A process for the dusting of bakery dough to prevent sticking of the dough which comprises uniformly dusting bakery dough with a dry, powdered starch composition comprising from about 50 to about 60 percent by weight of granular starch and correspondingly from about 40 to about 50 percent by weight of gelatinized starch, the said gelatinized starch being derived by gelatinizing and drying native starch having a pH of from about 6.0 to about 9.0, the weights based on the weight of the composition, the said granular starch containing from about 0.5 to about 0.05 percent by weight of coconut oil based on the weight of the granular starch, the said gelatinized starch having a cold water solubility ranging from about 10 to about 60 percent, the said composition having a bulk density ranging from 28 to 32 pounds per cubic foot with the proviso that 100% of the composition is capable of passing through a #40 mesh screen, 80% of the composition is capable of passing through a #100 mesh screen and no more than 20% of the composition is capable of passing through a #270 mesh screen.

References Cited in the file of this patent

UNITED STATES PATENTS

| | | |
|---|---|---|
| 1,499,080 | Short | June 24, 1924 |
| 2,469,957 | Fenn | May 10, 1949 |
| 2,614,945 | Krisan | Oct. 21, 1952 |